(12) United States Patent
Citrin et al.

(10) Patent No.: US 7,730,424 B2
(45) Date of Patent: Jun. 1, 2010

(54) METHODS AND SYSTEMS FOR DISPLAYING INFORMATION ON A GRAPHICAL USER INTERFACE

(75) Inventors: Warren Citrin, Highland, MD (US); Eric Conn, Woodbine, MD (US)

(73) Assignee: Gloto Corporation, Fulton, MD (US)

( * ) Notice: Subject to any disclaimer, the term of this patent is extended or adjusted under 35 U.S.C. 154(b) by 336 days.

(21) Appl. No.: 11/312,117

(22) Filed: Dec. 20, 2005

(65) Prior Publication Data

US 2007/0143709 A1 Jun. 21, 2007

(51) Int. Cl.
G06F 3/00 (2006.01)
(52) U.S. Cl. ............... 715/830; 715/828; 707/7
(58) Field of Classification Search ............ 715/828, 715/830, 864; 705/26; 707/7
See application file for complete search history.

(56) References Cited

U.S. PATENT DOCUMENTS

| | | | |
|---|---|---|---|
| 5,592,375 A | 1/1997 | Salmon et al. | |
| 5,710,887 A | 1/1998 | Chelliah et al. | |
| 5,794,207 A | 8/1998 | Walker et al. | |
| 6,011,542 A * | 1/2000 | Durrani et al. | 345/156 |
| 6,131,087 A | 10/2000 | Luke et al. | |
| 6,574,608 B1 | 6/2003 | Dahod et al. | |
| 6,578,014 B1 | 6/2003 | Murcko | |
| 6,598,027 B1 | 7/2003 | Breen et al. | |
| 6,674,428 B2 * | 1/2004 | Horsley | 345/184 |
| 6,847,938 B1 | 1/2005 | Moore | |
| 6,868,392 B1 | 3/2005 | Ogasawara | |
| 7,002,553 B2 * | 2/2006 | Shkolnikov | 345/169 |
| 2001/0034723 A1 | 10/2001 | Subramaniam | |
| 2002/0069117 A1 | 6/2002 | Carothers et al. | |
| 2003/0004898 A1 | 1/2003 | McAuliffe et al. | |
| 2003/0204445 A1 | 10/2003 | Vishik et al. | |
| 2003/0212609 A1 * | 11/2003 | Blair et al. | 705/26 |
| 2004/0002903 A1 | 1/2004 | Stolfo et al. | |
| 2004/0049434 A1 * | 3/2004 | Khoo et al. | 705/26 |
| 2004/0172340 A1 | 9/2004 | Bishop et al. | |
| 2004/0215526 A1 * | 10/2004 | Luo et al. | 705/26 |
| 2004/0225574 A1 | 11/2004 | Arnold et al. | |
| 2004/0267631 A1 | 12/2004 | Narodetsky | |
| 2005/0010484 A1 | 1/2005 | Bohannon et al. | |
| 2005/0038733 A1 | 2/2005 | Foster et al. | |

* cited by examiner

Primary Examiner—William L Bashore
Assistant Examiner—Meseker Takele

(57) ABSTRACT

Methods and systems for facilitating communications and commerce between remote device users and merchants or sponsors, particularly adapted for small-screen portable devices such as cellular telephones and personal digital assistants. The invention enables sponsors to quickly and easily, without the requirement for specialized or expensive equipment, establish Web sites to advertise their products and services. The invention provides unique, intuitive graphical interfaces enabling users to find Web sites of interest easily and quickly amongst many sites. In addition to real-time, direct sponsor-user communications, the system further includes features such as response time prioritization, which enable users to quickly determine the relevance of a sponsor response.

25 Claims, 12 Drawing Sheets

ACTION-TOPIC-WHEEL ENTRIES 1300

| | | | | | | | |
|---|---|---|---|---|---|---|---|
| EAT | Restaurants | Diners | Pizza | Ice Cream | Groceries | Bakeries |
| DRINK | Brew Pubs | Bars | Restaurants | Smoothies | 0 | 0 |
| PARTY | Party Supplies | Caterers | Planners | 0 | 0 | 0 |
| CONNECT | Singles | Dating Services | Adult | 0 | 0 | 0 |
| VIEW | Museums | Galleries | Exhibits | 0 | 0 | 0 |
| ATTEND | Plays | Movies | Art | Dance | Operas | 0 |
| PLAY | Toy Stores | Hobby Supplies | 0 | 0 | 0 | 0 |
| EXERT | Gyms | Golf | Bicycles | Skateboards | Hikes | 0 |
| BUY | Garage Sales | Cars | Antiques | Motorcycles | Sporting Equip | Toys |
| GIVE | Gifts | 0 | 0 | 0 | 0 | 0 |
| HIRE | Job Candidates | 0 | 0 | 0 | 0 | 0 |
| CONSULT | 0 | 0 | 0 | 0 | 0 | 0 |
| DRIVE | Cars | Motorcycles | Mass Transit | 0 | 0 | 0 |
| TRAVEL | Travel Agents | Bed & Breakfasts | Airlines | Trains | Buses | 0 |
| HOUSE | For Sale | For Rent | Room Mates | 0 | 0 | 0 |
| WORK | Want Ads | 0 | 0 | 0 | 0 | 0 |
| MAINTAIN | Handy Man | Plumbers | Gardeners | Painters | 0 | 0 |
| FIX | Contractors | Plumbers | Painters | 0 | 0 | 0 |
| BUILD | Contractors | Plumbers | Architects | 0 | 0 | 0 |
| CREATE | Hobby Supplies | 0 | 0 | 0 | 0 | 0 |
| READ | News | Books | 0 | 0 | 0 | 0 |
| RELAX | Day Spas | Massage | Beds | 0 | 0 | 0 |
| LEARN | Schools | Books | 0 | 0 | 0 | 0 |
| PRIMP | Beauty Care | Hair Salons | Barbers | Day Spas | Nail Salons | 0 |
| ATTIRE | Sports Wear | Coats/Jackets | Shoes | 0 | 0 | 0 |
| CARE | Health Care | Adult Care | Child Care | Beauty Care | 0 | 0 |

Fig. 13

METHODS AND SYSTEMS FOR DISPLAYING INFORMATION ON A GRAPHICAL USER INTERFACE

CROSS-REFERENCE TO RELATED APPLICATIONS

The present invention relates to co-pending U.S. patent application Ser. No. 11/312/811 filed on [same date herewith] and to co-pending U.S. patent application Ser. No. 11/312,903 filed on [same date herewith].

FIELD OF THE INVENTION

The present invention relates generally to communications and more specifically to methods and systems for graphically displaying information in a limited space.

BACKGROUND OF THE INVENTION

Personal communication devices have become ubiquitous amongst users. Today, cellular telephones, personal digital assistants, networked computers, and numerous other communication devices are found everywhere. Many types of communication channels and methodologies facilitate these devices, for example: local- and wide-area wired and wireless networks, broadband communication networks, and many others as are well known to the reader.

Concomitant with the explosive growth of communication technologies has come the development of very inexpensive storage. The inexpensive and readily available proliferation of communication devices, communication methodologies and inexpensive storage has resulted in the development of huge quantities of instantly available data and information to those with communication devices. One well-known method of accessing and distributing information is the Internet, accessible today using all of the various communication devices and methodologies described above. However, many other methods and systems for accessing and distributing such information are available and known to the reader, for example: mobile telephone networks, personal digital assistant networks, conventional dial-up networks, and others.

Ready access to huge amounts of information, however, is not necessarily a panacea for businesses and consumers. While improving the ability for businesses to present information to consumers, the prolific growth of information has resulted in many challenges to both parties. One well-known problem is that of consumers being overwhelmed with too much data. While useful information may be readily available, it can be very difficult to find. Further, the costs and complexities of establishing information sources, for example Web sites on the Internet, can be prohibitively difficult and expensive for small businesses.

In addition to the challenge of actually finding useful information, customers are further challenged by having to interpret the often impersonal nature of the information. This is particularly true in the field of services. While service providers may make their basic contact and availability information known on the Internet, it is very difficult for a consumer to be able to read such information and determine whether the services, hours of business, fees, etc. meet the consumer's needs. For example, while it may be relatively easy for a customer to find the telephone number of a plumber in an emergency, it may be difficult and time consuming for the customer to determine if that plumber can timely meet his needs. As another example, while it may be relatively easy for a customer to locate a restaurant of a particular food type or in a particular location, it may be more challenging to determine if that restaurant can meet that customers individual needs for seating, reservations, etc.

As noted above, it is often difficult and expensive for smaller merchants to adequately advertise their services and capabilities to consumers. The costs and complexities associated with the Internet and networked electronic communications make the use of such methods and communication channels challenging for small businesses. Ironically, it is these very same small businesses that may provide the most personalized and useful services to customers if the customers were able to receive and use the business advertisements and information.

The present inventors have determined that there is a significant need in the marketplace for methods and systems of facilitating communications between merchants and customers that enables merchants to effectively communicate, and customers to readily and effectively receive and use, individual, personalized information. The need is particularly significant with respect to the above-described electronic communications, pervasively in use today. The need is particularly challenging as to communicating large quantities of information in a useful, space-efficient manner.

SUMMARY OF THE INVENTION

The present invention facilitates the communication of large quantities of information between parties such as merchants and consumers. As described below, while not thus limited, it is particularly well suited to efficiently communicating relatively large amounts of information to users of portable communication devices having relatively limited display space such as small screens.

In accordance with one embodiment of the invention there are provided methods and systems for selecting information of interest to a user, a method comprising: receiving a plurality of units of information; enabling a user to electronically display at least three graphical wheels, the first wheel comprising a plurality of indicators identifying actions, the second wheel comprising a plurality of indicators identifying topics associated with the actions and a third wheel comprising a plurality of indicators identifying narrowing criteria associated with the actions and the topics; enabling a user to electronically rotate the at least three graphical wheels to identify a selected action, a selected topic and a selected narrowing criteria; and based on the selected action, selected topic and selected narrowing criteria, identifying at least one of the units of information.

In accordance with one embodiment of the invention there are provided methods and systems for facilitating communications between a user and a sponsor, a method comprising: receiving a plurality of units of information; creating a matrix including a first column and at least one additional column each including a plurality of rows containing displayable indicators; the displayable indicators in the first column indicating a plurality of actions, the displayable indicators in the at least one additional column indicating a plurality of topics; enabling a user to display the matrix graphically, the first column comprising a first graphical wheel and the at least one additional column comprising at least one adjoining graphical wheel; enabling a user to electronically rotate the first graphical wheel to identify a selected action; enabling a user to electronically rotate the at least one adjoining graphical wheel to identify a selected topic associated with the selected action; identifying, based upon the selected action and the selected topic, a plurality of selected units of information from the plurality of units of information; and transmitting the plurality of selected units of information to the user.

In accordance with one embodiment of the invention there are provided methods and systems for operating an electronic display to identify a provider of products, a method comprising: electronically displaying a first graphical wheel containing indicators of actions and a second graphical wheel containing indicators of topics; electronically rotating the first graphical wheel to select an indicator representing an action of interest; electronically rotating the second graphical wheel to select an indicator representing a topic of interest; transmitting the selected action and topic to a system; and receiving from the system information based on the selected action and topic.

The present invention simplifies and streamlines electronic communications between parties, particularly between merchants and customers. It enables a consumer to search large quantities of information to determine which merchants can provide goods and services within their constraints. It gives a merchant an opportunity to communicate their relevance to each consumer request by their ability to provide the requested goods and services within the consumer-defined constraints and by each merchant's responsiveness. In this way, consumers have a voice in the marketplace and small businesses compete with large businesses on a more equal basis, with ability and responsiveness determining relevance rather than advertising and search engine keyword placement and sponsorship. The invention inherently protects consumer privacy and anonymity during each consumer-merchant exchange and it does not have vulnerabilities associated with other online commerce models, such as search engine click fraud.

DESCRIPTION OF THE DRAWING FIGURES

These and other objects, features and advantages of the present invention will become apparent from a consideration of the Detailed Description of the Invention when considered in conjunction with the drawing Figures, in which.

Figure 5:
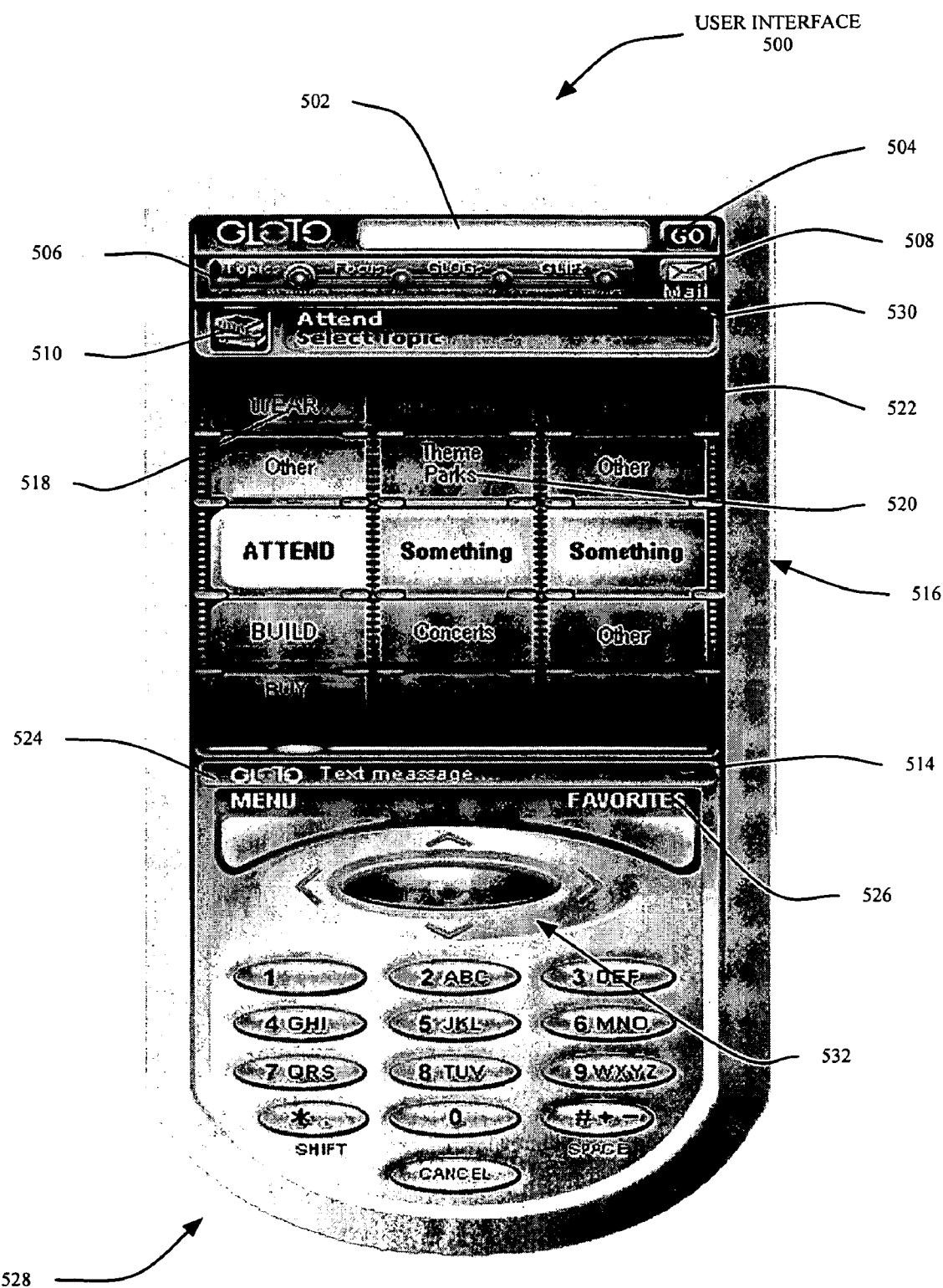
FIG. 5 is an illustration of a user interface, particularly an action-topic-array graphical wheel, by which a user can select topics of interest.
Figure 11C:
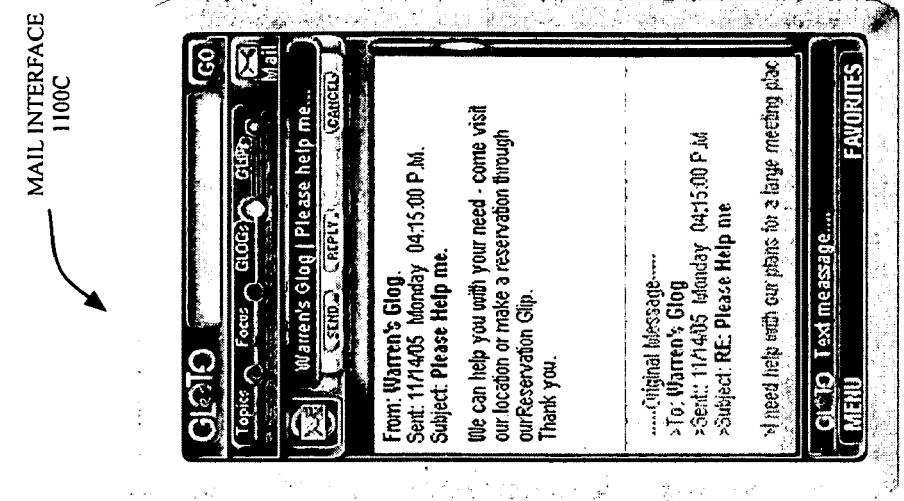
Figure 11B:
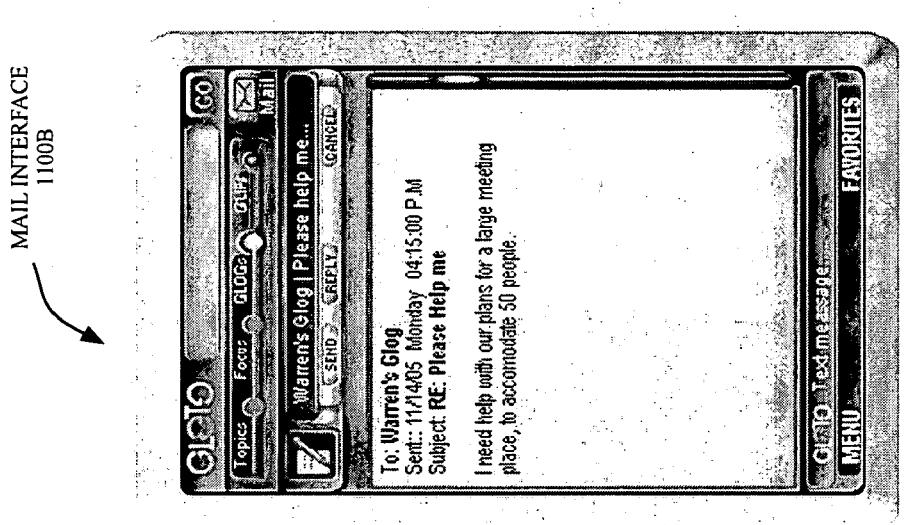
Figure 11A:
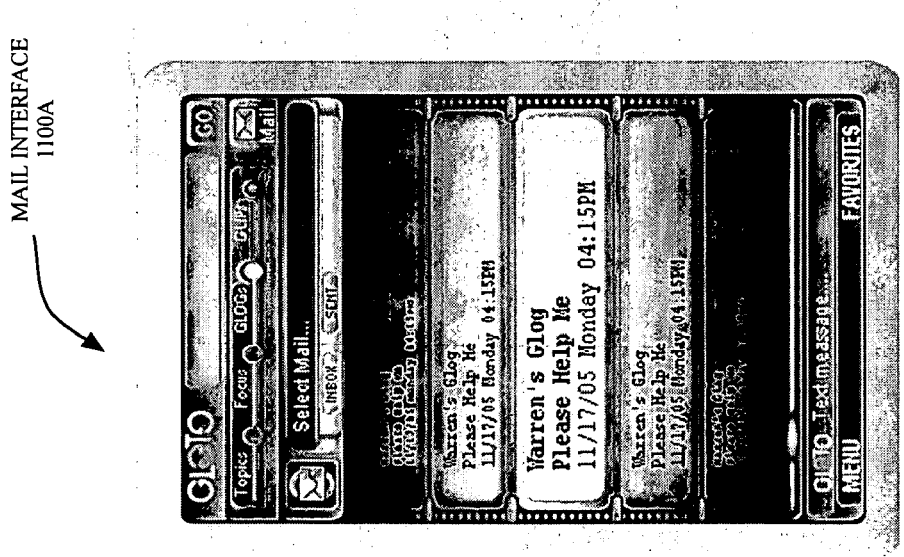
Figure 12:
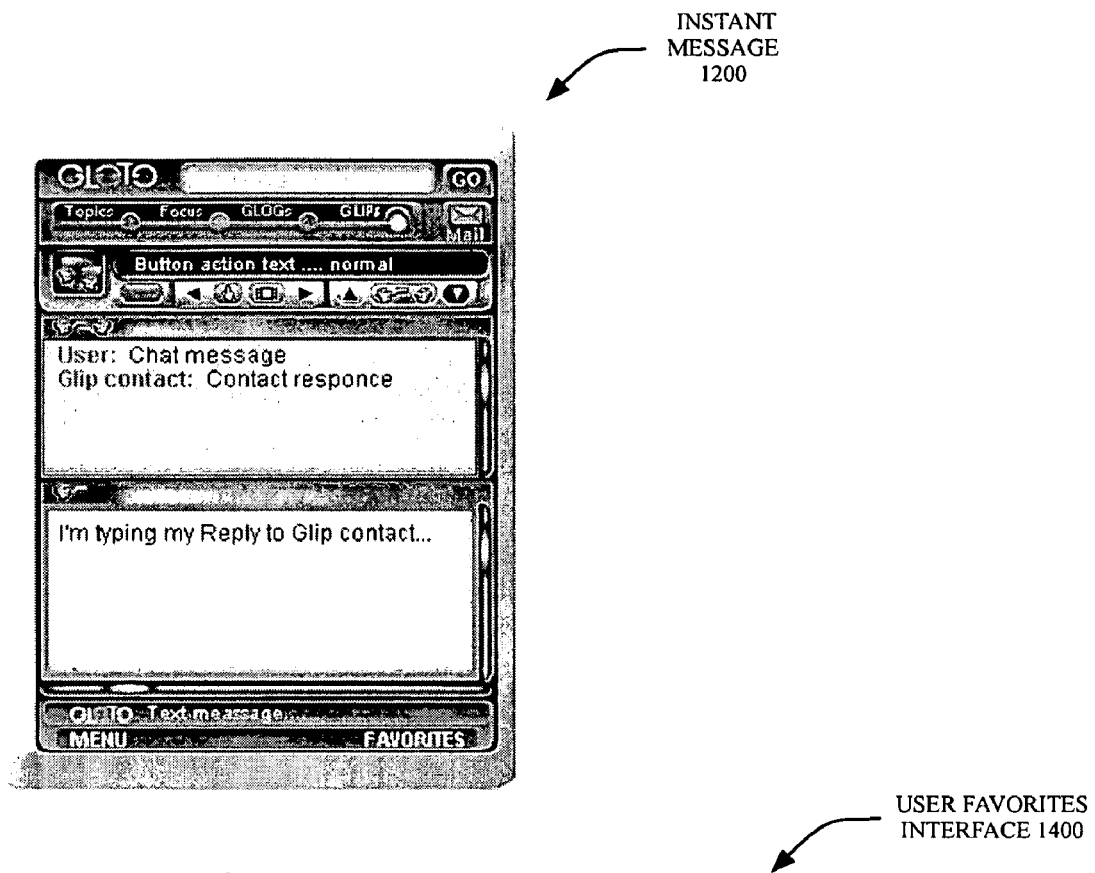
Figure 14:
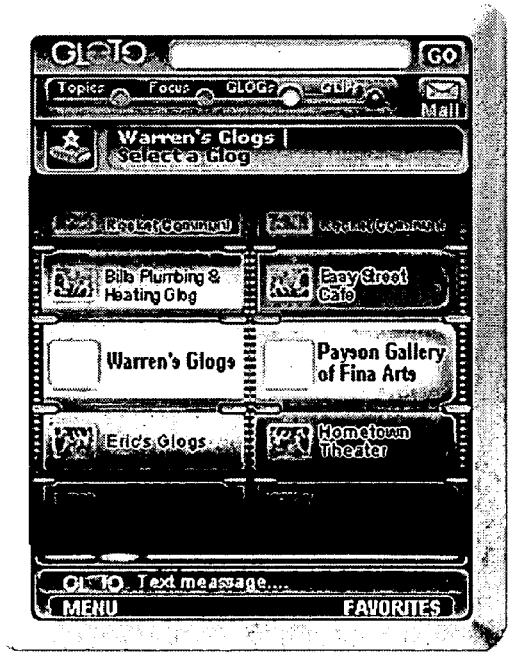
Figure 15:
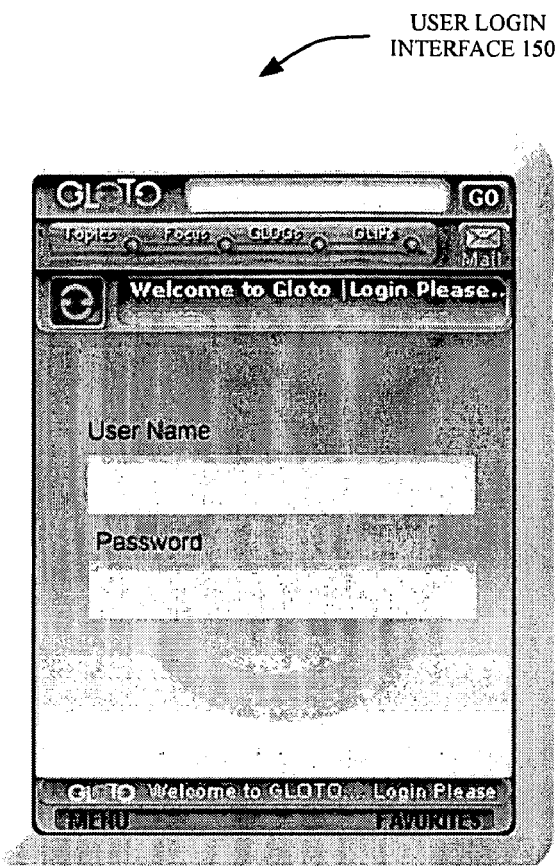
Figure 16:
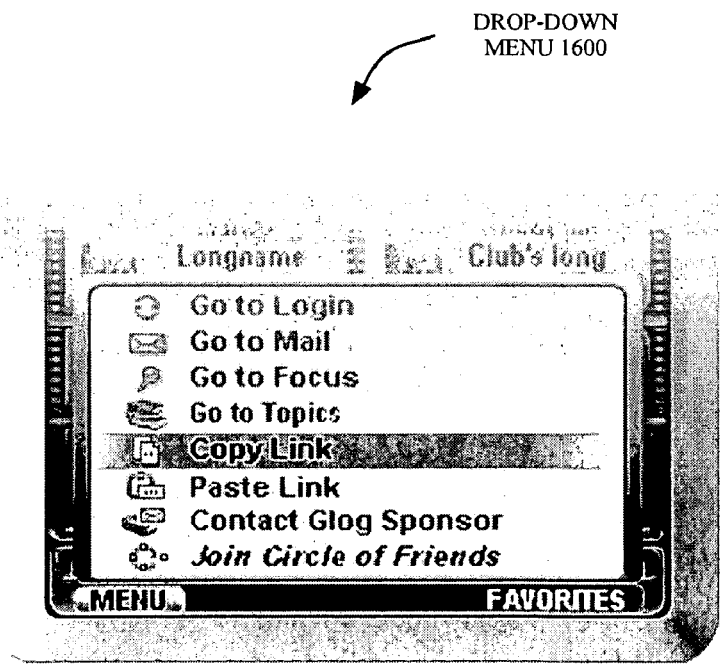

FIGS. 11A, B, C are illustrations of a series of user interfaces, particularly for facilitating anonymous e-mail communications between a sponsor and a user;

FIG. 12 is an illustration of a user interface, particularly for facilitating instant message communications between a sponsor and a user;

FIG. 13 is a table showing exemplary terms usable to populate the action-topic-array wheels, or menu, shown in FIG. 5;

FIG. 14 is an illustration of a user interface, particularly for facilitating a user to navigate and access previously stored favorite sponsor sites;

FIG. 15 is an illustration of a user interface, particularly for facilitating log-in of a user to the system; and FIG. 16 is an illustration of a user interface, particularly an example of displayed choices in a drop-down menu.

DETAILED DESCRIPTION OF THE INVENTION

The present invention is a web-based service that enables asymmetric communications ideal for commerce and other online social and commercial interactions between various parties. The invention's features, operation and user interfaces have been developed for presentation and navigation on small display screens, such as those found on cell phones, pocket personal computers (PCs), and personal digital assistants (PDAs), although it is understood that, larger-screen devices, such as notebook computers, can be used to access the system as well. As an Internet service, the present invention can be accessed from any Internet capable device.

While described below with respect to facilitating commercial transactions, the present invention is a generic capability and not limited to a commercial system, commerce service, or content distribution broker. However, the present invention lends itself nicely to commercial transactions and provides substantial benefits to small businesses and consumers.

As used herein, examples and illustrations are intended to be representative and not limiting in nature.

As used herein, a "site" or "Web site" or variant thereof refers to an overarching collection of content, such as an Internet Web site. A "page" or variant thereof refers to an identifiable unit of content within a site. The content can include, for example, audio, pictures or graphics, video, text and/or other content as can be used in accordance with the methods and systems described below.

The terms "sponsor," "merchant," "small business" and variants thereof are used interchangeably herein to identify an offerer of products or services.

The terms "customer," "consumer," "user" and variants thereof are used interchangeably herein to identify a procurer of products or services.

As used herein, references to "products" or "services" and variants thereof interchangeably include both products and services.

Figure 1:
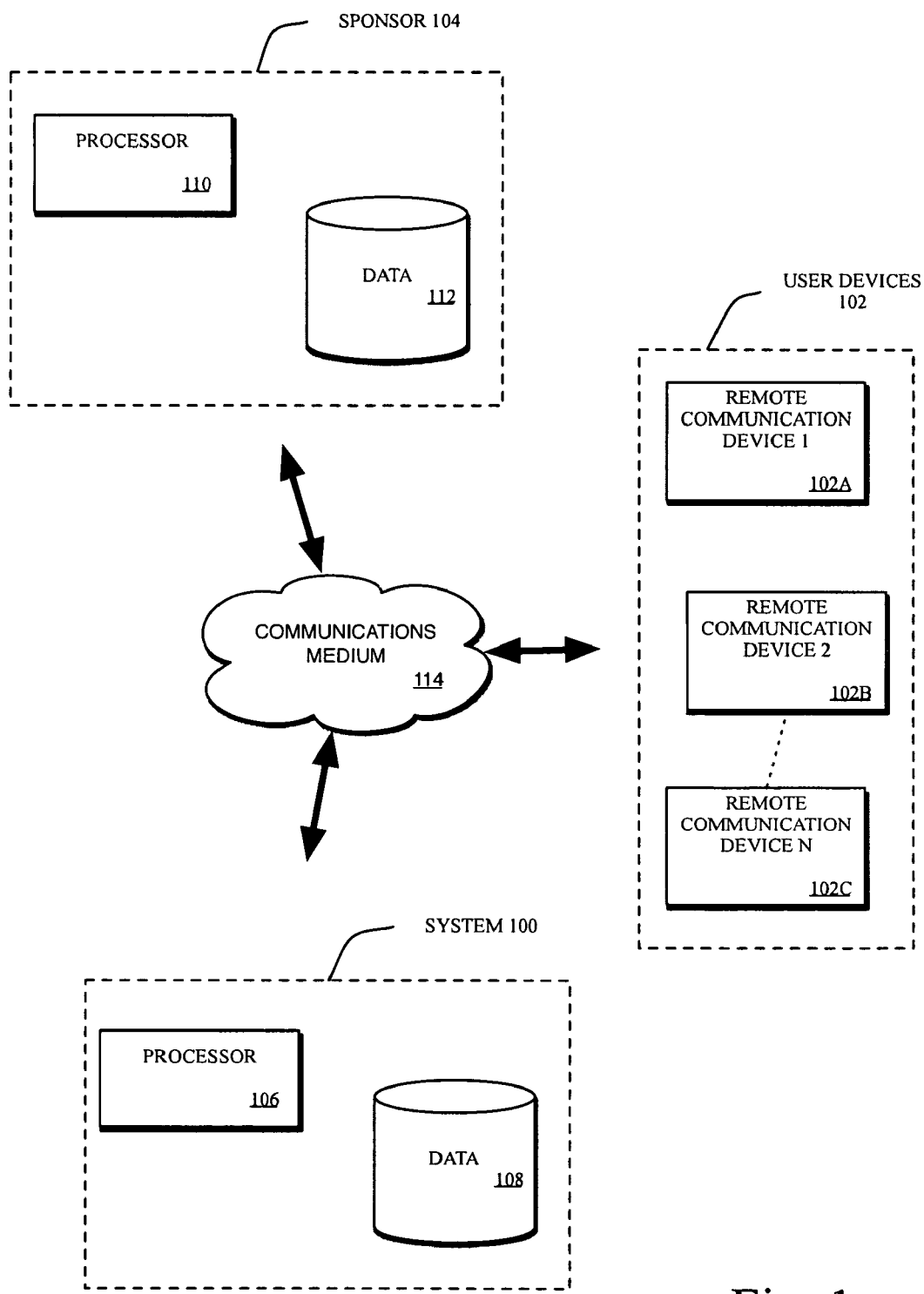
FIG. 1 is a block diagram of a system for facilitating communications between sponsors and users in accordance with the present invention.

With reference now to FIG. 1, there is shown and described a system 100 for facilitating communications between parties. As shown and described herein, the first party comprises a user 102 of a remote communications device, for example a cellular telephone, personal digital assistant, or laptop computer. For purposes of describing the present invention, three such devices are illustrated herein, at 102A, 102B, 102C. With the addition of several inventive features, described herein below, these communication devices comprise substantially conventional devices as are known in the art. Users can comprise customers or consumers as described above, or any other party desiring to communicate with sponsors as described below. It will be understood by the reader that essentially limitless numbers of device operators and devices are contemplated by the present invention.

The second party, described herein as a sponsor 104, comprises a party wishing to communicate with the user of the remote communication devices. It will be understood that, while the present invention is shown and described with respect to the facilitation of communications between a commercial merchant and a consumer, the invention, as described herein, is not thus limited.

System 100 is seen to include a processor 106 and a data storage device 108. Sponsor 104 is seen similarly to include a processor 110 and a data storage device 112. In their simplest form, each of systems 100 and sponsor 104 comprises a conventional processor connected to a conventional data storage system, for example comprising a combination of optical memory, magnetic memory and semiconductor memory. Each of systems 100 and 104 further includes conventional computing system components such as a user interface, operating system and software, communications interface and other standard components and features as are known in the art. The reader will appreciate that the invention is not limited to any particular system configuration. Numerous system variations, including multi-processor systems, distributed data processing systems, server-based computing systems, notebook-based computing systems, mainframe-based computer systems and others will now be apparent.

The various parties are seen to communicate through an appropriate communications medium 114, for example comprising a cellular telephone communications system, a public or private network such as the Internet, and/or others as will now be apparent to the reader.

Figure 2:
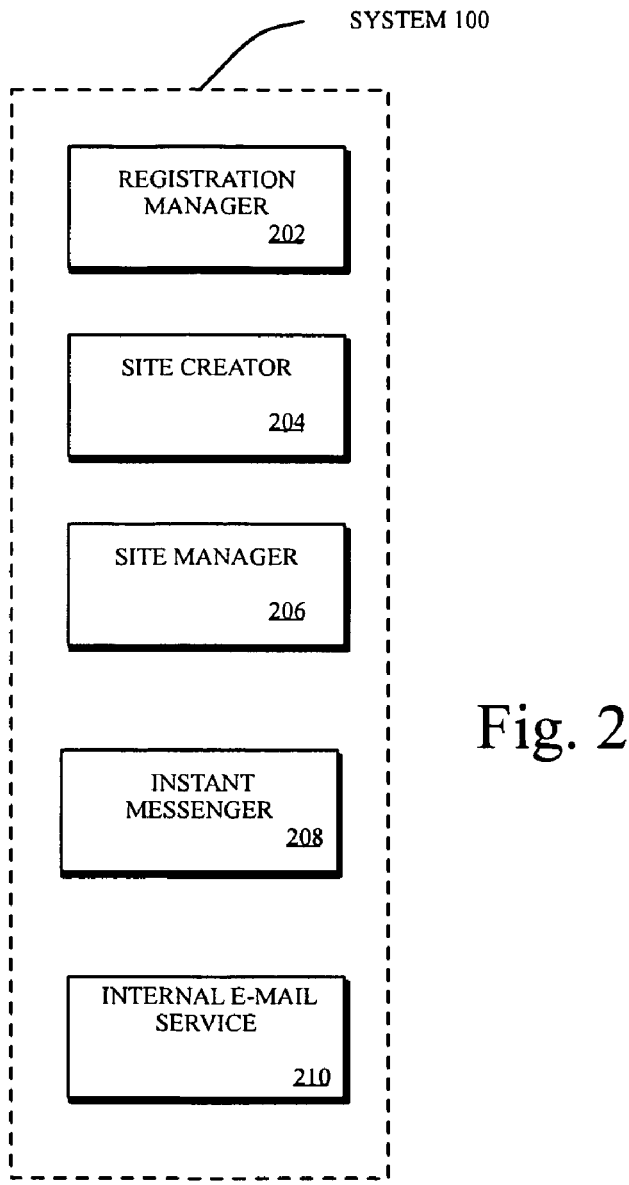
FIG. 2 is a block diagram illustrating functional aspects of the system of FIG. 1.
Figure 3:
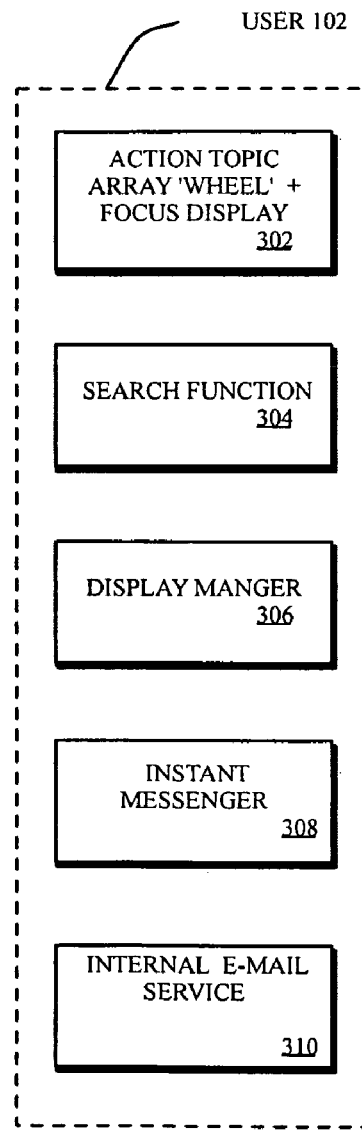
FIG. 3 is a block diagram showing functional aspects of the user devices of FIG. 1.

With reference now to FIGS. 2 and 3 there are shown and described functional elements of system 100 and certain of the inventive aspects of devices 102. System 100 is seen to include a registration manager 202, a site creator 204, a site manager 206, an instant messaging system 208 and an internal email service 210, the internal email service preferably operable to maintain the identities of users anonymous to the sponsors in the manner described herein below. It will be understood that these functions may be implemented in hardware, software, or a combination of the two. The communication devices 102 are seen to include an action topic array "wheel" and focus function 302, a search function 304, a site display manager 306, an instant messaging system 308 and an internal email service 310, the internal email service functional to communicate with internal email service 210 of system 100. The operation of these functional features of the invention is described in detail herein below.

Figure 4:
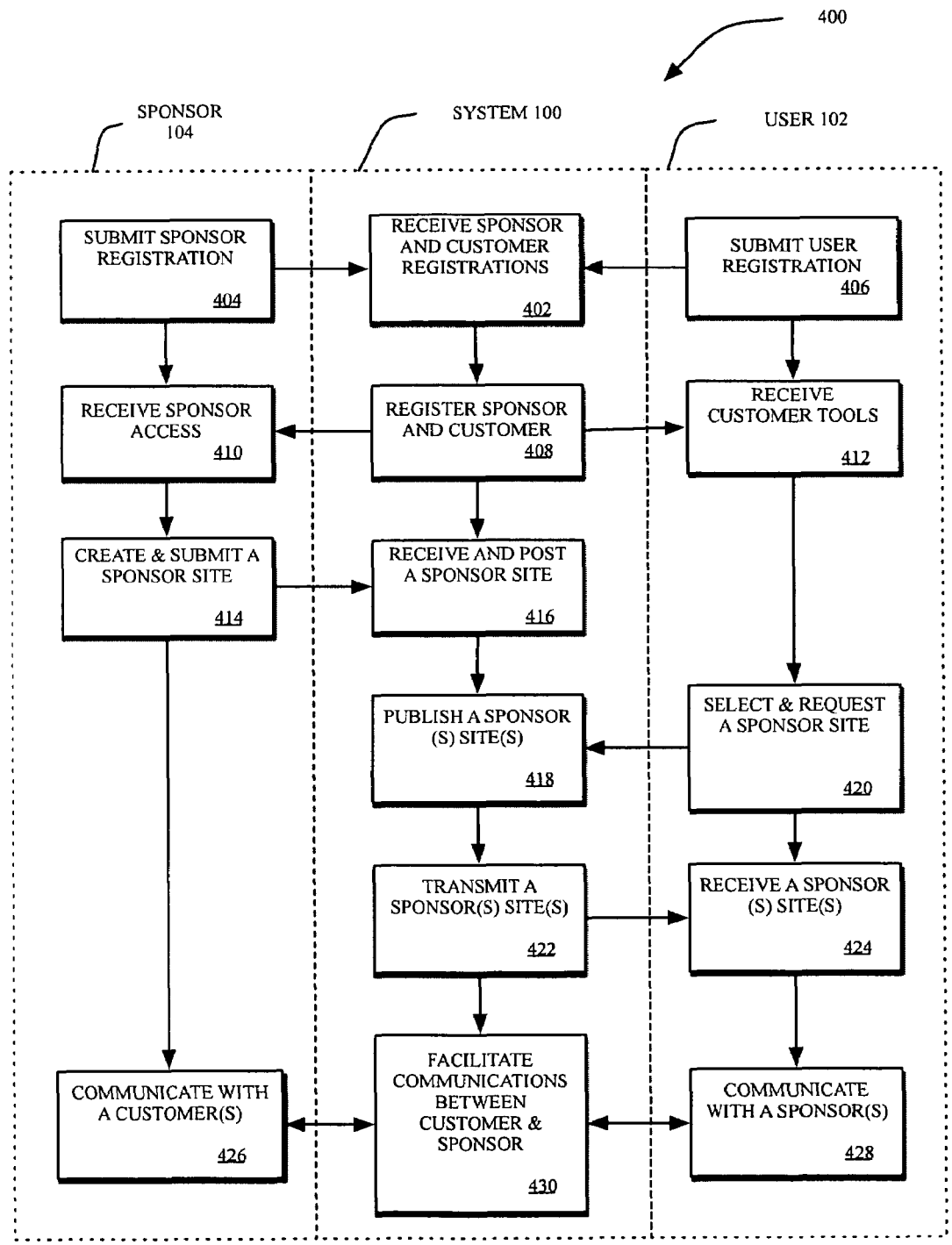
FIG. 4 is a flow chart showing a sponsor-user communication process in accordance with the present invention.

With reference now to FIG. 4, there is shown a process 400, utilizing the apparatus described above, whereby system 100 facilitates various communications and interactions between sponsor 104 and user 102. Process 400 is illustrated so as to identify the various steps therein in vertical alignment with the performing party, i.e. sponsor 104, system 100 and/or user 102 as identified in FIG. 4.

Initially, system 100 is set up to receive registration information (step 402), including sponsor registration information (step 404) and, optionally, user registration information (step 406). Sponsor registration includes information such as: sponsor name, sponsor address, sponsor email address, service type, sponsor hours, sponsor phone, sponsor fax, sponsor web site address.

User information, optionally provided by the user, can include such information as: email address, postal/zip code, age, and sex. The registration process can be performed, for example, by registration manager 202 described above. As noted above, the registration of user 102 is optional. In accordance with the described embodiment of the invention, a user can receive access to most of the functions of system 100 and the features of the invention without registration. In the described embodiment of the invention, registration with the provision of an email address is necessary for a user to utilize the email and messaging services described herein below.

Subsequent to the registration of the sponsor and the user (step 408) the sponsor is granted access to the features of system 100 (step 410) as described herein below, while particular software tools are downloaded to the user (step 412). Access and software tool downloads can be managed, for example, by registration manager 202.

Having registered and been granted access to system 100, sponsor 104 creates a sponsor site (step 414). Creation of the site can, for example, be performed by the site creator 204 described herein above.

In the described embodiment of system 100, the system provides a selection of predetermined templates with which sponsors can easily create a Web site. For example, selecting a "create a Web site" button brings up a browser based fill-in-the-blanks form to create a Web site including: name and logo, page names and logos, page content, Web site and page settings and permissions. Web site creation requires sponsors to provide identifying information including, business name, address, telephone number, e-mail address, web site information, credit card and transaction information, and other information as will now be apparent to the reader. Content addition to an established Web site can be done from the system 100 application directly or from the system 100 website.

System 100 is developed to enable sponsors to create Web sites for presentation on small display screens and, as described in detail herein below, efficient navigation formats appropriate for on-the-go usage. The below-described user interfaces provide users an effective and scalable way to navigate through large quantities of topics and sites of various lengths and formats. Although the sites themselves do not limit the creativity of the sponsors, as noted above the system provides templates for sponsor use as guides for layout, content, sizing, text and icon placement, and page segmentation. A library of templates can be provided for all common sponsor topics such as "For Sale by Owner", bars and restaurants, personals, brick-and-mortar merchants, and on-line entertainment and shopping. System 100 may also desirably provide universal Web site templates for polls, surveys, and quizzes (PSQs), site credits and contact lists, resumes, events, lists of trusted chat partners called the InnerCircle, and shared phonebooks.

The sponsor-generated Web site is subsequently received by system 100 and posted within system 100 so as to make it available to a user (step 416). Posting and subsequent management of sponsor sites can, for example, be handled by the site manager function 206 described herein above.

Once created, received and posted in accordance with the above described processes, the sponsor sites are published (step 418), whereby they are made available for viewing by users as described herein below. As described below, publication is accomplished by associating each sponsor site with a descriptive topical indicator, for example a token, icon or phrase, searchable by a user and through the selection of which the user can identify and retrieve the Web site. In addition to being associated with one or more topical keywords, each sponsor site is associated with narrowing fields which a user can select and system 100 can use to narrow the number of sponsors associated with a topical indicator. As described in detail below, these narrowing fields enable a user to input information of import to the user in selecting a sponsor.

An exemplary sponsor site may comprise a segmented production of multiple pages, with each segment containing text, photos, video, audio, or other content determined by the sponsor. Any business can become a sponsor 104, typically upon the payment of a monthly usage and hosting fee to the operator of system 100. For example, a restaurateur may wish to buy a site for her business. She may decide that she wants the site to be comprised of four pages or segments; one called "Our Menu", another called "Today's Specials", a third representing an on-line coupon redeemable within a certain period of time, and a fourth with a photo of the restaurant called "Elegant Atmosphere". The overall name of the site in this example is "Elaine's French Cuisine". When a user navigates to the "Elaine's French Cuisine" site using the navigation features described herein below, they are presented with the four pages Elaine has produced and the user can successively select the pages they wish to view. Another example would be a site called "Bill and Donna's House", with perhaps four pages; "House Specs", "Inside Pictures", "Outside Pictures" and "Latest Contract Status". Those interested in possibly buying Bill's and Donna's house would visit Bill's and Donna's site.

The system 100 Web site is intended to provide a sponsor with a simple and effective way to "tell their story" with as little or as much technical effort as they wish. A page can contain just some typed text or it can contain a professionally edited video segment. A page can also include a link to one of the sponsor's traditional Web sites if they happen to have one. A feature and advantage of the system 100 Web sites is that they enable a sponsor to label discrete pieces of their message in an easily understood way for the user. A series of small, targeted pages with individual descriptive titles, rather than a single web site URL, is important for small screen information location and viewing. For the vast majority of businesses and private sellers without Web presences, the system 100 Web site is a valuable alternative. Also, since nearly all one- and two-word English phrase '.com' domains have been registered at this point in time, owning a memorable and pertinent .com domain name is practically impossible for most small merchants. The present invention enables navigation topically and locally and does not require that sponsor web site names be unique; so this namespace collision problem is not likely to exist amongst users of the present invention.

With reference now to FIG. 5, as was described above, a user 102 desiring access to the functions of system 100 is provided a tool to facilitate this access. In particular, the tool includes the download of a software package which provides a series of graphical user interfaces for interacting with system 100. An exemplary user interface, typically displayed as the initial, or starting screen for users, is shown at 500 in FIG. 5. It will be understood that the interface displayed in FIG. 5 is an "Action Topic Array" (ATA) user interface, and that this, and additional user interfaces providing additional functionality, are described herein below.

To gain access to system 100, a user optionally logs into system 100 by entering identifying information such as a user name, an email address or a unique screen name and a password. See FIG. 15 for an exemplary user log-in interface 1500. While optional, registration and logging on may provide additional benefits to the user. Users that log in may be enabled to use system features not available to those who don't, for example: correspondence with sponsors, setting of preferences, notification requests and shortcuts, the ability to view locked sites and pages to which a registered user would otherwise have access, and others as will be apparent to the reader. As noted above, user registration is not required and anyone (logged on or not) can view publicly viewable sponsor materials.

Considering now the details of user graphical interface 500, the interface is seen to include a bar, or data entry space, 502 for receiving user input in the form of alpha-numeric characters. A button 504 is provided for initiating certain actions as described here in below. An array of workflow status buttons 506 is provided to indicate to a user which feature or function is currently being accessed. An indicator showing queued mail is displayed at 508. A status window 510 displays various icons indicating the status of the system. Two scrolling lines display changing, scrolling data, one upper line at 530, and one lower line at 514. A centralized, rotatable, vertically-oriented, graphical wheel, indicated generally at 516, is seen to include a left-most wheel at 518, a center wheel at 520 and a right-most wheel at 522.

A second array of selectable buttons is displayed at the bottom of the screen, a first button 524 providing access to a menu feature, while a second button 526 provides access to user-defined favorite sponsor sites. As described above, the reader will understand the above-described buttons to include graphical, software buttons. An assortment of fixed-function and programmable physical buttons are typically included on the hardware device, positioned as indicated generally at 528 underneath of the graphical display. A typical four-way navigation and central 'select' or 'fire' button assembly is indicated at 532. Many appropriate mobile devices will be apparent to the reader. It will be understood that the exact structure and function of the various buttons, as well as the exact layout of the graphical user interface, will vary between mobile devices.

FIG. 16 shows an example of a drop-down menu 1600 displayed through the operation of menu button 524, the various displayed choices on the drop-down menu dependent on the function of the main screen at the time the drop-down menu button is selected.

With reference now back to FIG. 4, with sponsor sites available in system 100, it is now possible for users to select and request sponsor sites of interest (step 420). This process 420 of selecting and requesting sponsor sites is shown and described with respect to FIG. 6, wherein there is initially seen the step of downloading the user software (step 602) for displaying the ATA graphical user interface 516 as described herein above. As will be described in detail below, the action topic array wheel provides a user-friendly and user-intuitive method for users to find sponsors sites of interest. This ATA function can be operated by the action topic array function 302.

In accordance with the present invention, the left-most portion of wheel 516, that is wheel 518, includes a series of short verbs indicating different activities that a user might wish to engage in. Central wheel 520 includes a variety of nouns, each indicating a particular location, event, or other noun that may be of interest based upon the selected action. Right-most wheel 522 includes a series of optional sub-topic nouns, each further narrowing the selection of the first two wheels. The sub-topics on the center and right-most wheels are thus used in combination with the selected action to identify a topic of interest to the user. In order to select a topic of interest, the user operates the four position (North, South, East, and West) and center Fire buttons indicated at 532 to align the various displayed wheels (step 604) so as to identify the user's topic of interest (step 606), the topic of interest used by system 100 to identify a first set of associated sponsors. The available sponsor topics are thus presented as a set of rotating cylinders and an indicator showing the selected action and related topics and subtopics. The labels on each right selection wheel are automatically refreshed with selections appropriate to the selection on the wheel to its left.

Exemplary topics of interest might include, for example:

TABLE 1

|  | WHEEL 1 (Action) | WHEEL 2 (Topic 1) | WHEEL 3 (Sub-Topic N) |
| --- | --- | --- | --- |
| SELECTION 1 | FIX | PLUMBER | RESIDENTIAL |
| SELECTION 2 | ATTEND | CONCERT | ROLLING STONES |
| SELECTION 3 | BUY | GROCERIES | MEAT |
| SELECTION 4 | BUY | THEATER TICKETS | MUSICAL |

With reference to FIG. 13, an expanded ATA entry table 1300 is seen, the virtual 'wheels' aligned in vertical columns, the entries positioned in vertical columns and horizontal rows. The left-most column contains actions, the subsequent columns to its right indicating with nouns, topics and sub-topics as described above. It will be seen that each set of row entries is directly associated with the user selection(s) to its left, the number of entries diminishing as the user electronically rotates each wheel to identify a topic of interest.

Figure 7:
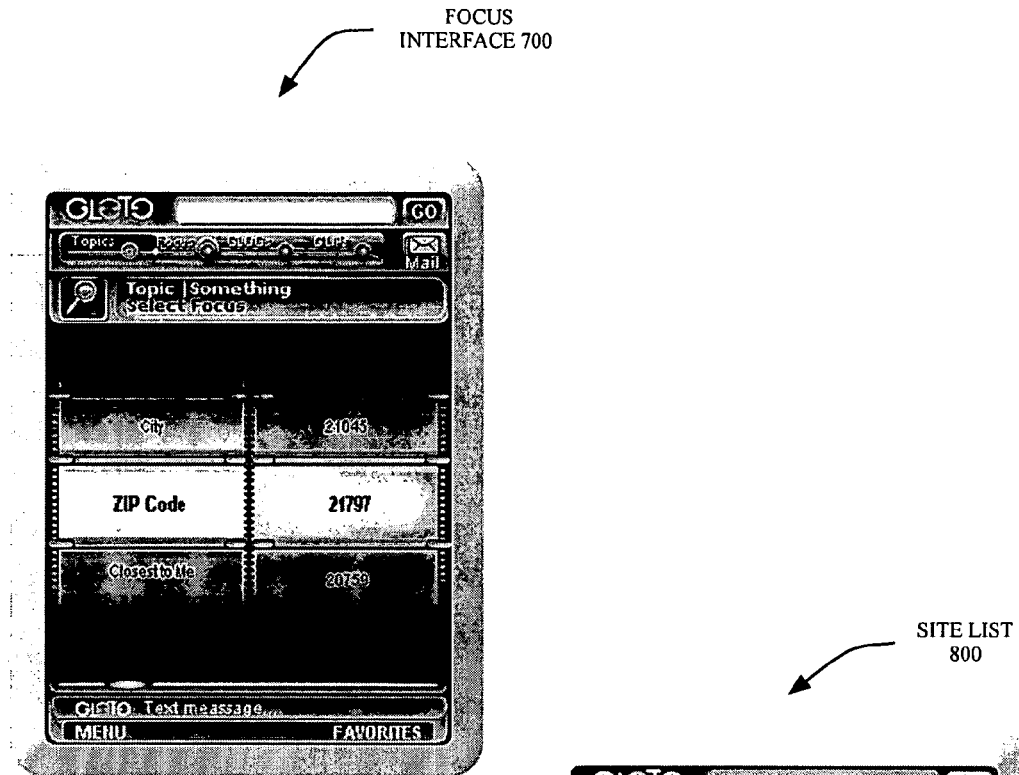
FIG. 7 is an illustration of a user interface, particularly for filtering on multiple sponsor sites to focus down on one or few.

Subsequent to the general alignment of the wheels to indicate the topic of interest, the user presses the center Fire button in keys 528 to indicate the selection. The graphical user interface 700 illustrated in FIG. 7 then appears, and the keys 528 are again operated so as to provide a focus, or narrowing of the search results provided back to the user (step 608). As will be seen from the FIG. 7, the focus screen allows the user to focus their search results based on additional filtering criteria pertinent to them. Such criteria may include: the location (city, county, zip code, etc.), name, type of business (online, "brick and mortar", etc.), distance from the user, category of content (classifieds, personals, time-sensitive or location-sensitive coupons with bar codes, etc.), date since last visited by the user, a pre-selected option (last focus setting, a pre-defined favorite focus, etc.) and others as will now be apparent to the reader. In the described embodiment of the invention, the focus information is provided to the user as additional wheels, shown in FIG. 7, which the user may 'rotate' as described above narrow his or her focus of interest. In association with the selection of focus fields using the electronic wheels, a user may enter specific information associated with a wheel selection into screen entry area 502.

It will be understood that, as described herein, in the arrangement of the virtual ATA and focus wheels, the rows and columns are interchangeable, the horizontal or vertical layout of the wheel being a routine design choice. References to rows and columns are thus interchangeable with respect to the practice of the invention. Further, while the illustrations generally show three adjoining wheels, the invention is not limited. More or less wheels may be displayed at any time and additional wheels may be substituted for display as choices are made using the initially displayed wheels. For purposes of describing the present invention, the phrase "topical indicator" and variations thereof are used to identify a user's selection of any number of action, topic and focus indicators, including the provision of focus data pertinent to the selected focus indicator, so as to identify one or more sponsors of interest.

As is described in further detail below, the present invention's use of topic and focus-based navigation and page presentation eliminates the traditional keyword usage for finding content and facilitating commerce. Using simple action-topic and focus navigation matrices, the present invention eliminates guesswork for the page sponsor and the user. In contrast to the prior art, user searching is simplified and sponsors do not need to buy keywords, optimize websites for search engines or be concerned about click fraud.

It will be appreciated that the above-described methods and systems for identifying and focusing on topics provides users the ability to easily find and navigate between sponsor sites. For example, a user may be interested in buying a house in a certain city. Using the topic identification and focus features, the user can find and consider sites for houses (or anything else) in just the region of interest. In this example, there may be several sites that meet the user's house hunting criteria. The user is free to peruse the pages from any of these sites.

Equally important, the above-described Action-Topic Array and sponsor/user interaction are more suitable for small screens than traditional search engines and web sites. A short-word, action-based topic navigation menu gives the user an easy television-like menu selection mechanism. Also, the inherent research feature of service 100, whereby a user simply specifies their explicit wants and needs to sponsors via the communications mechanism and is provided with only those responses that are relevant, is ideal for a small screen. Typing in hit-or-miss keyword phrases and viewing thousands or millions of mostly irrelevant web site links, the traditional model for online searching, is not feasible or desirable on a small screen.

In the described embodiment of the invention, system 100 retains composite statistics on user topic searches, topic requests, and numbers of responses, as a function of time, geography and so on. This information is made available to all sponsors and is particularly helpful to small business and entrepreneurs in identifying un-served and under-served markets. The invention thus facilitates the ability of sponsors to be competitive in serving a market, while maintaining the privacy of the users.

Figure 6:
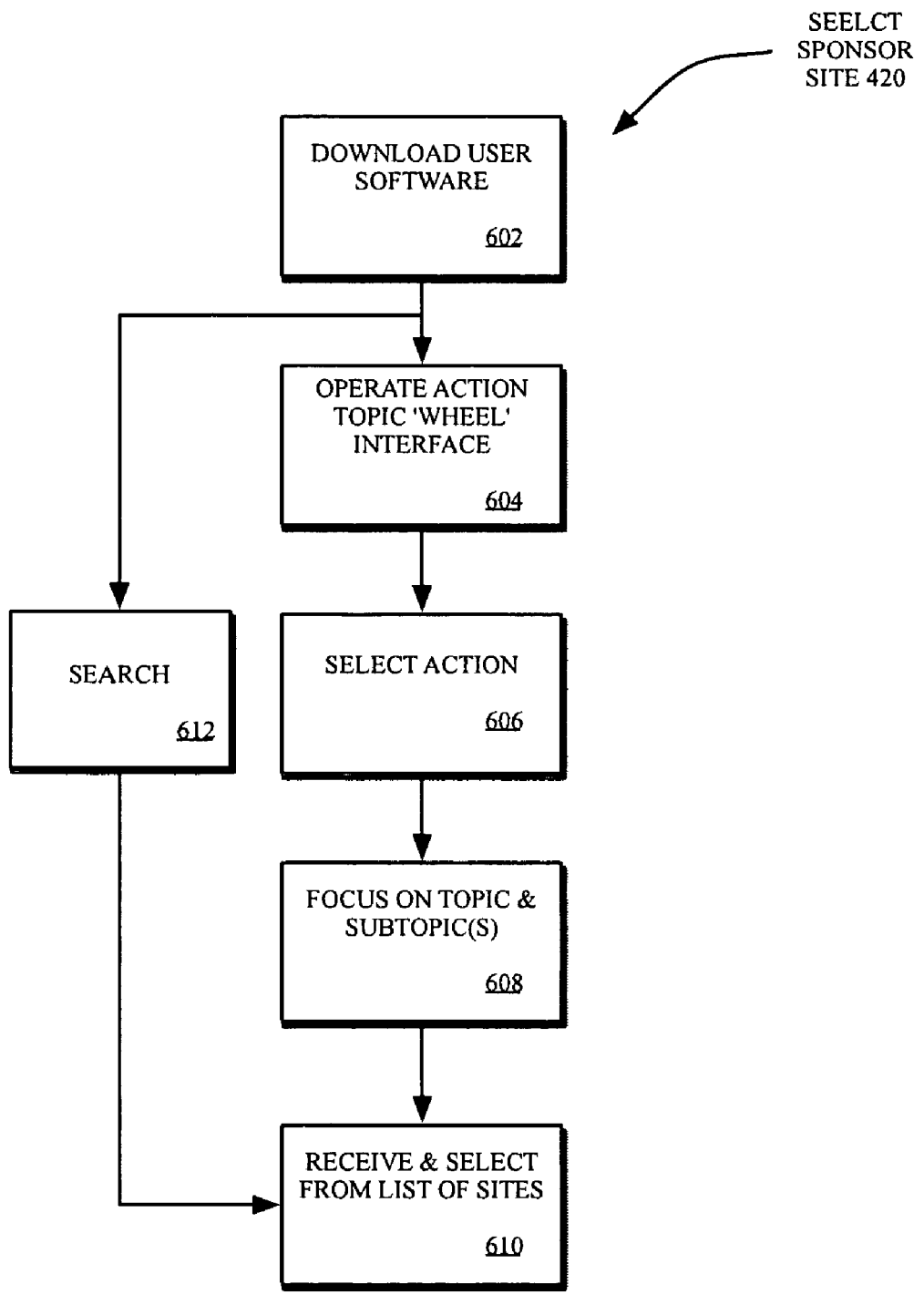
FIG. 6 is a flow chart showing a process by which a user locates a sponsor site.
Figure 8:
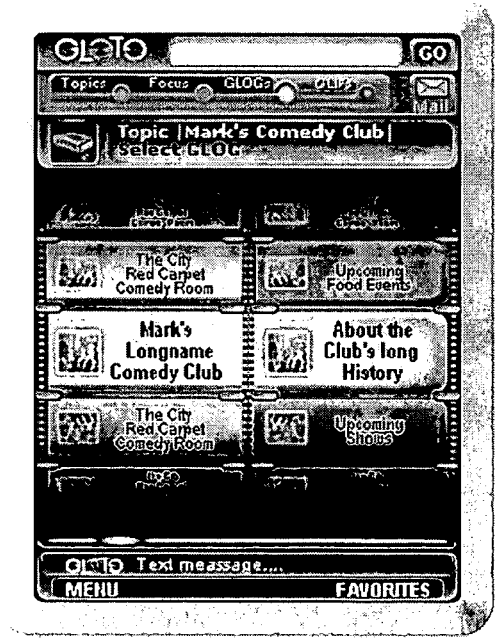
FIG. 8 is an illustration of a user interface, particularly for receiving a list of sponsor sites.
Figure 9:
FIG. 9 is an illustration of a user interface, particularly for displaying actual sponsor sites.

Continuing with reference to FIG. 6, there is subsequently returned to the user a list of sites, using the graphical user interface 800 as shown in FIG. 8, these sites having been identified through the selection of a topic and the subsequent focusing as described herein above. The user receives these search results through the displayed graphical user interface, typically in the form of topically identified wheels and/or buttons, and uses the keys 528 to select the desired product or service (step 610). Upon using keys 528 to select the desired Web site, the selected Web site will be displayed in a graphical user interface 900 such as is shown with respect to FIG. 9.

Despite the significant advantages provided by the action-topic-array wheel and focusing functions, it is recognized that some users may wish to search using keywords. As an alternative to the selection and focus on topics, in the manner described above, the invention further provides the ability for the user to search directly using keywords (step 612), for example using the search function 304. These keywords may be entered, using keys 528, directly into data entry window 502. Depending on the selected keywords, selected search results will appear in the graphical user interface shown and described with respect to FIG. 8.

It will be understood by the reader that the various graphical user displays made available to user 102 may be controlled by the display manager 306.

With reference now back to FIG. 4, subsequent to the transmission of the selected sponsor web site (step 422) by system 100 and the receipt thereof by the user (step 424), there is supported a communications session between the sponsor (step 426) and the user (step 428), the communications session facilitated by system 100 (step 430).

Figure 10:
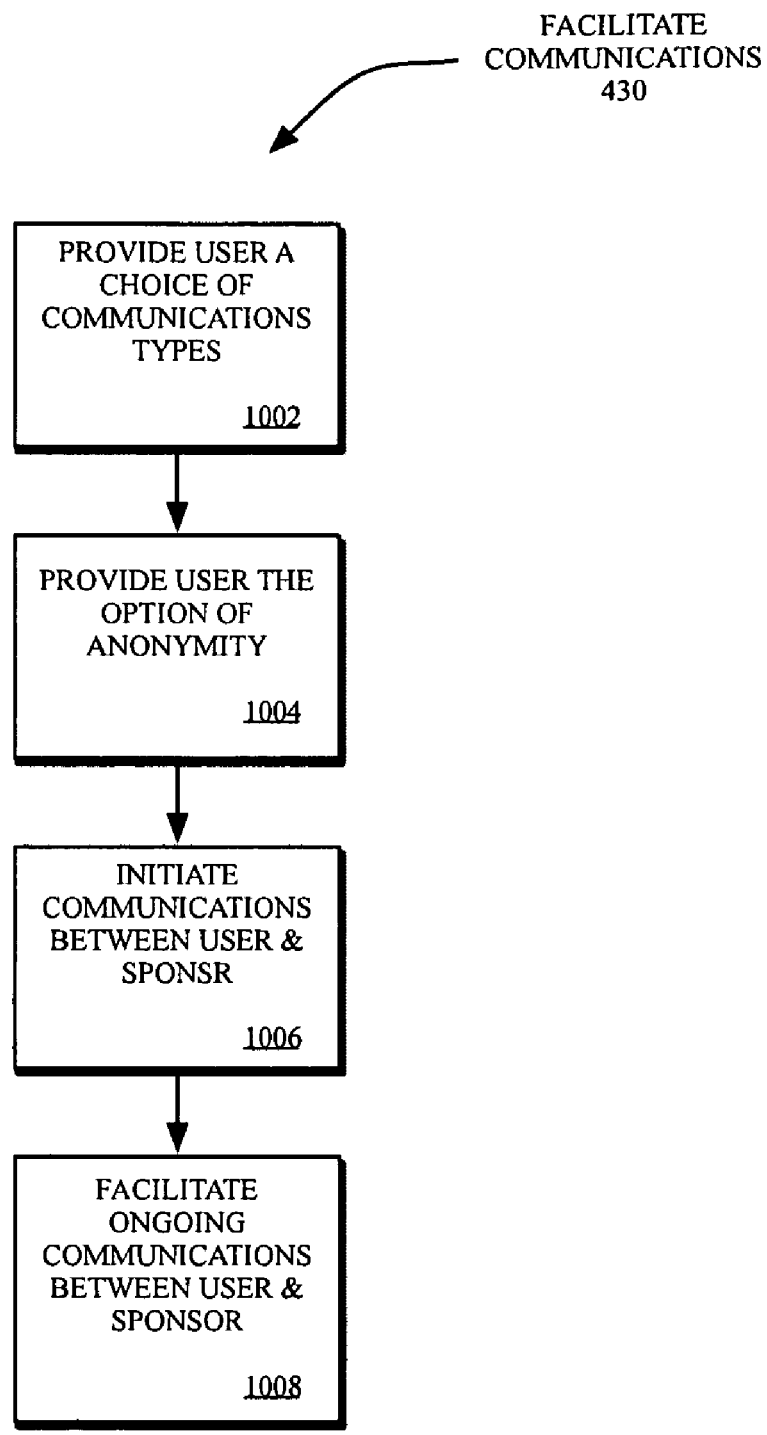
FIG. 10 is a flow chart showing a process for facilitating communications between sponsors and users.

With reference now to FIG. 10, there is shown in detail the process 430 of facilitating communications between the user and the sponsor. Initially, there is provided by system 100 to the user 102 a choice of communication types (step 1002), for example including: traditional e-mail communication, instant message communication, and others as will be apparent to the reader. Each user is also provided the option of anonymous communications (step 1004).

With respect to anonymity, users are less likely to use any commerce system that places their privacy at risk. Most online merchants and services require consumer information. Direct calls to merchants often result in immediate consumer identification through caller id and phone records. Services that require consumer information but promise to hold it in confidence are inherently vulnerable to hackers or unintentional disclosure. The present invention does not, initially, require any identifying user information since the service is offered free of charge to users. Users may manually or automatically through GPS devices enter a location from which to measure the distance to sponsors if they wish, but the location can be a zip code (post office location) or any other reference point and can be changed at will. In the described embodiment of the invention, system 100 enables the sponsor/user dialogue by assigning tracking numbers to user requests and by delivering responses to user accounts defined by a user-specified account name. The user's identity is anonymous because even system 100 itself does not know or verify the user's identity.

Upon the selection of the communication type and any indication as to whether the user would like anonymity, system 100 initiates communications between user 102 and sponsor 104 (step 1006). In accordance with the described embodiment of the present invention, system 100 includes various servers and facilitators for facilitating the on-going communications between the user and the sponsor (step 1008). These various communication functions can be supported by the instant messenger 308 and internal e-mail service 310 functions described herein.

FIGS. 11A, B, C show an exemplary series of e-mail interfaces, 1100A illustrating an e-mail user-selection interface, 1100B illustrating a user-entered email, 1100C illustrating a user-received sponsor email. FIG. 12, shows an exemplary instant messenger interface 1200.

As described, sponsors are provided with mail accounts on system 100 that allow them to read and respond to the anonymous originating user. The user is also provided with a mail account that enables them to read sponsor responses. When the user chooses to view his responses, the default sequence in which the responses are presented to the user is the time order in which the sponsors responded. In other words, sponsors who respond quickly are positioned more visibly to the user. The user can respond to the sponsors' responses indefinitely. However, the sponsor can only respond once to each user correspondence. This provides the user with the confidence that he or she is in control of the communication process while using system 100 and can not be spammed.

Responsiveness to user requests, whether measured in time or ability to meet stated user need, is in accordance with the described embodiment of the invention, the greatest determiner of relevance of a sponsor to a user. When a user composes mail to more than one sponsor, the sponsor network order, as seen by the user, is adjusted to reflect those who are most responsive to the correspondence. In this way, the receiving sponsor can control his or her own list ranking by reviewing the received mail and by quickly responding to it. In the described embodiment, the present invention does not permit automatic responses from sponsors because the objective is for the sponsor to read the user request and to respond only when appropriate.

For example, a hypothetical user Joe is interested in buying a used motorcycle from a sponsor close to home. User Joe operates system 100 to find sites in his area sponsored by people or businesses selling their motorcycles. User Joe decides to send anonymous e-mail to all of the listed sponsors selling Harley Davidson® motorcycles, asking them if they deliver. Two of the sponsors respond saying they will. The sponsor responses are initially ordered on User Joe's display screen by timeliness of response. User Joe likes only one of the two respondents' motorcycles, so he sends another anonymous message to only that sponsor asking about availability. The selected sponsor responds and user Joe decides to let that sponsor know who he is so that they can close the deal. In each of these exchanges, the sponsors remain completely unaware that the system 100 internal email (email service 210, 310) is from user Joe until Joe decides to let his choice of sponsors know who he is. In this way, user Joe is not spammed, sent unwanted emails, or any other communications from the sponsors he has rejected. Also, the sponsors are limited to responding only once to each of User Joe's messages so that they cannot continue the dialogue unless user Joe wishes to continue it, as he does with the selected sponsor.

The reader will appreciate that the present invention offers significant advantages to both the sponsor and the user. When shopping by telephone, a consumer in need of services is typically left with a significant research burden. The need for a tradesman, such a plumber, typically results in a yellow pages search, usually starting with the largest advertiser under the trade. Calls by users are placed, answering machines record the request, and in many cases, a service person is not immediately available at the location called. After several calls and time spent searching, a consumer might get satisfaction. However, the overall prior art process is inefficient and involves a significant degree of luck. The present invention, with its real-time facilitation of communications between the sponsors and the users, greatly diminishes the challenges a consumer faces in finding products or services using the prior art.

Consumers are also saddled with considerable burdens when seeking goods in the modes of Website or physical on-site shopping. The tendency is for a consumer to either go to the large chain stores in well known locations where they are more likely to find the item than at small stores, or to go online on the Internet to find the products. Both of these methods have shortcomings. Large chains have severely damaged small business in many areas and economic consolidation of power in the hands of a few large merchants has significant shortcomings for the consumer as well as the smaller merchants. The often-noted lower prices the large merchants squeeze from their suppliers and employees comes at a great public cost. Price control through competition rather than consolidation is believed by the present inventors to be a more desirable approach. The present invention enablement of direct consumer requests to multiple merchant segments gives the small merchant an equal chance to respond to the consumer and determine their relevance, regardless of advertising budget. The consumer benefits because he knows, via the communications interaction, present inventory, availability, and other influencing information only accessible to the merchant. In addition, the present invention provides inherently an asynchronous background process that permits the consumer to enter desires for goods and services over time and receive the results whenever it is convenient. Search engines require devotion to the task at hand. The conventional, online search engine process stalls when the consumer is not actively searching. The burden to guess appropriate keywords and decipher search results lies entirely with the consumer.

Businesses without an Internet web presence, which includes many small businesses, do not exist in the Internet search space. Those that do have a web presence are listed in order of their keyword relevance or ability to afford pay-per-click sponsored ads. The present invention levels this playing field by facilitating discovery of actual merchant relevance at a particular moment in time; a time of need to the consumer. This is much more effective for both merchant and consumer than a relevance determined by which merchant has met the search engine keyword algorithm definition of relevance a priori—i.e. which merchant could afford to buy keywords within a search engine.

One unique feature of the present invention particularly suited for on-the-move users is the notify mechanism. Through the user interface, users and sponsors can request that service 100 monitor sites for new updates and receive automatic notification whenever a site or page has changed or been updated. This feature provides an "active favorites" capability that is especially suitable for monitoring events, time-sensitive or location-sensitive sales, streaming sites, and blogging dialogue. In the described embodiment of the invention, a list of favorites is established by the user, for example through a graphical interface such as is shown in FIG. 14 at 1400. As illustrated, the favorites are selected using a wheel structure, the left-most wheel listing sponsor Web sites, the right-most wheel listing different pages available on each available site. Users identify active favorites by operating the above-described buttons to align and select windows on the wheels. The user-requested active favorites information is delivered real-time to the consumer through the 'crawl' or scrolling data window 514 at the bottom of the screen (see FIG. 5), received from sponsors 104 and transmitted to users 102 by system 100. This makes the requested, useful data constantly available to the user in a helpful and non-disruptive manner.

Another advantage of the present invention is the virtual elimination of advertising click-fraud. In one described embodiment, the business model is subscription-based and derives no revenue directly from advertising. No user actions affect the fees paid by the sponsors. The sponsors are in complete control of their budgets and charges. This is in contrast to the conventional online pay-per-click advertising model, whereby merchants use advertisements to drive traffic to their Web sites. As is known in the art, these advertisements are subject to malicious click attacks by customers, competitors, and/or computer 'clickbots'. Click fraud is a growing problem and is estimated to account for 25-35% of online ad revenue, all at the expense of the advertisers. By eliminating advertisements, the present invention also eliminates advertising click-fraud.

There have thus been provided new and improved methods and systems for facilitating communications and commerce between remote device users and merchants or sponsors. In accordance with the present invention, these methods and systems are adapted to facilitate communications between sponsors and users of small-screen portable devices such as cellular telephones and personal digital assistants. The system provides methods and systems whereby sponsors can easily and without the requirement for specialized or expensive equipment establish Web sites to advertise their products and services. The invention uses a unique, intuitive graphical interface to allow users to find Web sites of interest easily and quickly amongst many sites. In addition to real-time, direct sponsor-user communications, the system further includes features such as response time prioritization, which enable users to quickly determine the relevance of a sponsor response. The invention has application in the fields of e-commerce and communications.

While the invention has been shown and described with respect to particular embodiments, it is not thus limited. Numerous modifications, changes and improvements falling within the scope of the invention will now occur to those skilled in the art.

What is claimed is:

1. A method operable on a mobile device for selecting information of interest to a user, comprising:
   a) receiving product and service information from a plurality of participating product and service providers;
   b) enabling the user to electronically display at least three virtual graphical wheels, the first virtual graphical wheel comprising a plurality of indicators identifying actions identifying activities of interest to a user, the second virtual graphical wheel comprising a plurality of indicators identifying topics associated with the actions and a third virtual graphical wheel comprising a plurality of indicators identifying narrowing criteria associated with the actions and the topics;
   c) enabling the user to electronically rotate the at least three virtual graphical wheels to:
      i) allow the user to select from the first virtual graphical wheel, an action identifying activities of interest to the user from among the plurality of indicators identifying actions,
      ii) allow the user to select from the second virtual graphical wheel, a topic from among the plurality of indicators identifying topics associated with the previously selected action, and
      iii) allow the user to select from the third virtual graphical wheel, a narrowing criteria from among the plurality of indicators identifying narrowing criteria,
   wherein the selected action, topic and narrowing criteria are linked in an implied hierarchical order in that the selected topic further defines the previously selected action identifying an activity of interest to the user by particularizing the object of the action identifying said selected activity of interest and the selected narrowing criteria further defines the previously selected topic by particularizing the topic,
   d) based on the selected activity interest to the user, selected topic and selected narrowing criteria, identifying, in real-time, at least one participating product or service provider from among said plurality of product and service providers that satisfy the criteria defined by the user selected action, topic and narrowing criteria, wherein the selected narrowing criteria is based on additional filtering criteria specified by the user, the criteria being and specific to the user including one or more personalized current or targeted geographical and temporal filters; and
   wherein the plurality of indicators identifying actions, topics and narrowing criteria are dynamically updated in real-time on said at least three virtual graphical wheels in accordance with said current or targeted personalized geographical and/or temporal filters specific to the user.

2. The method of claim 1 and further including the step of displaying the identified at least one product or service provider to the user.

3. A system for selecting information of interest to a user, comprising: a memory storing control instructions; and a processor connected to the memory and operative to perform the steps of:

receiving product and service information from a plurality of participating product and service providers;

enabling the user to electronically display at least three virtual graphical wheels, the first virtual graphical wheel comprising a plurality of indicators identifying actions identifying activities of interest to a user, the second virtual graphical wheel comprising a plurality of indicators identifying topics associated with the actions identifying activities of interest to a user, and the third virtual graphical wheel, comprising a plurality of narrowing criteria, wherein the selected action, topic and narrowing criteria are linked in an implied hierarchical order in that the selected topic further defines the previously selected action by particularizing the object of the selected activity of interest to the user and the selected narrowing criteria further defines the previously selected topic by particularizing the previously selected topic, wherein the plurality of identifiers identifying actions, topics and narrowing criteria are dynamically updated in real-time on said at least three virtual graphical wheels in accordance with current or targeted personalized geographical and/or temporal filters specific to the user; and enabling the user to electronically rotate the at least three graphical wheels to identify an action identifying an activity of interest to the user, a topic and a narrowing criteria;

wherein the narrowing criteria selected by the user is based on additional filtering criteria pertinent to the user including user selected personalized current or targeted geographical and temporal filters;

based on the selected activity of interest to the user, selected topic and selected narrowing criteria, identifying at least one product or service provider from among said plurality of participating product and service providers.

4. A system for selecting information of interest to a user, comprising:
   a) means for receiving product and service information from a plurality of participating product and service providers;
   b) means for enabling the user to electronically display at least three virtual graphical wheels:
   the first virtual graphical wheel comprising a plurality of indicators identifying actions identifying activities of interest to a user,
   the second virtual graphical wheel comprising a plurality of indicators identifying topics associated with the actions, and
   the third virtual graphical wheel, comprising a plurality of narrowing criteria,
   c) means for enabling the user to electronically rotate the at least three graphical wheels to identify an action identifying an activity of interest to the user, a topic and a narrowing criteria; and
   d) means for identifying at least one product or service provider from among said plurality of participating product and service providers, based on the selected action identifying an activity of interest to the user, selected topic and selected narrowing criteria,
   wherein the narrowing criteria selected by the user is based on additional filtering criteria pertinent to the user including user selected personalized current or targeted geographical and temporal filters;
   wherein the selected action, topic and narrowing criteria are linked in an implied hierarchical order in that the selected topic further defines the previously selected action by particularizing the object of the selected action identifying an activity of interest to the user and the selected narrowing criteria further defines the previously selected topic by particularizing the previously selected topic; and
   wherein the plurality of identifiers identifying actions, topics and sub-topics are dynamically updated in real-time on said at least three virtual graphical wheels in accordance with said current or targeted personalized geographical and/or temporal filters specific to the user.

5. Computer storage media storing a program product containing control instructions operable on a mobile device for selecting information of interest to a user, comprising: the control instructions operable on the mobile device to perform the steps of:

receiving product and service information from a plurality of participating product and service providers;

enabling the user to electronically display at least three virtual graphical wheels, the first virtual graphical wheel comprising a plurality of indicators identifying actions identifying activities of interest to the user, the second virtual graphical wheel comprising a plurality of indicators identifying topics associated with the actions, and a third virtual graphical wheel comprising a plurality of indicators identifying narrowing criteria associated with the actions and the topics;

wherein the selected action, topic and narrowing criteria are linked in an implied hierarchical order in that the selected topic further defines the previously selected action by particularizing the object of the selected action identifying an activity of interest to the user and the selected narrowing criteria further defines the previously selected topic by particularizing the previously selected topic, wherein the plurality of indicators identifying actions, topics and narrowing criteria are dynamically updated in real-time on said at least three virtual graphical wheels in accordance with said current or targeted personalized geographical and/or temporal filters specific to the user;

wherein the narrowing criteria selected by the user is based on additional filtering criteria pertinent to the user including user selected personalized current or targeted geographical and temporal filters; and enabling the user to electronically rotate the at least three graphical wheels to identify a selected action identifying an activity of interest to the user, a selected topic and a selected narrowing criteria; and based on the selected action identifying an activity of interest to the user, selected topic and selected narrowing criteria, identifying at least one product or service provider from among said plurality of product and service providers.

6. A method operable on a mobile device for facilitating communications between a user and participating product and service providers, comprising:
   a) receiving product and service information from the participating plurality of product and service providers;
   b) creating a matrix including a first column and at least a second and third column each of said columns including a plurality of rows containing displayable indicators; the displayable indicators in the first column indicating a plurality of actions identifying activities of interest to a user, the displayable indicators in the second column identifying topics associated with the actions, the displayable indicators in the third column identifying narrowing criteria associated with the actions and topics;

c) enabling the user to display the matrix graphically, the first column comprising a first virtual graphical wheel and the at least one additional column comprising at least one adjoining virtual graphical wheel;

d) enabling the user to electronically rotate the at least three graphical wheels to identify an action identifying an activity of interest to the user, a topic and a narrowing criteria;

f) based on the selected activity of interest to the user, selected topic and selected narrowing criteria, identifying at least one product or service provider from among said plurality of participating product and service providers, and g) transmitting the at least one product or service provider identity to the user wherein the selected action, topic and narrowing criteria are linked in an implied hierarchical order in that the selected topic further defines the previously selected action by particularizing the object of the selected activity of interest to the user and the selected narrowing criteria further defines the previously selected topic by particularizing the previously selected topic, wherein the plurality of identifiers identifying actions, topics and narrowing criteria are dynamically updated in real-time on said at least three virtual graphical wheels in accordance with current or targeted personalized geographical and/or temporal filters specific to the user.

7. The method of claim 6 and further including the steps of:

creating a second matrix including at least a first column containing displayable indicators each identifying a narrowing criteria for the subset of product and service providers;

enabling a user to display the second matrix graphically, the at least first column comprising a third virtual graphical wheel;

enabling the user to rotate the third virtual graphical wheel to identify a narrowing criteria associated with the subset of product and service providers; and using the narrowing criteria to limit the number of product and service providers wherein the narrowing criteria further defines the selected topic, and wherein the narrowing criteria selected by the user is based on additional filtering criteria pertinent to the user including user selected personalized current or targeted geographical and temporal filters.

8. The method of claim 7 and further including the steps of: determining the size of a display; and adjusting the size of the first and the at least one adjoining virtual graphical wheel so as to fit within the display.

9. The method of claim 6 wherein each indicator is selected from the group comprising a graphic, text and a combination of a graphic and text.

10. The method of claim 6 wherein the product and service information includes: an electronically stored page of information relating to the product or service; and an identifier of the product or service provider.

11. The method of claim 10 and further including the steps of:

receiving from the user an indication of a single product or service provider from the selected product and service providers; and providing to the user the page of information associated with the single product or service provider.

12. The method of claim 11 and further including the step of providing to the user an identifier of the product provider.

13. The method of claim 6 wherein the steps of enabling a user to electronically rotate the first virtual graphical wheel and the at least one adjoining virtual graphical wheel each includes the step of providing to the user at least one operable control button.

14. The method of claim 6 and further including the steps of:

enabling the user to identify at least one favorite product or service provider from among the selected product and service providers; and automatically providing update information on the favorite unit of product or service provider to the user.

15. The method of claim 8 wherein the step of adjusting the size includes at least one of the group comprising adjusting the number of indicators displayed, adjusting the size of the indicators displayed and adjusting the number of the at least one adjoining virtual graphical wheels displayed.

16. A system for facilitating communications between a user and a sponsor, comprising: a memory storing control instructions; and a processor connected to the memory and operative with the control instructions to perform the steps of:

receiving product and service information from a plurality of participating product and service providers;

creating a matrix including at least a first, second and third column each column including a plurality of rows containing displayable indicators; the displayable indicators in the first column indicating a plurality of actions identifying activities of interest to a user, the displayable indicators in the second column indicating a plurality of topics associated with the actions identifying activities of interest to the user, the displayable indicators in the third column indicating a plurality of narrowing criteria;

enabling the user to display the matrix graphically, the first column comprising a first virtual graphical wheel comprising a plurality of indicators identifying actions identifying activities of interest to a user; and the second column comprising a second graphical wheel comprising a plurality of indicators identifying topics associated with the identifying activities of interest to the user, and the third column comprising a third graphical wheel comprising a plurality of indicators identifying narrowing criteria particularizing the actions and topics;

enabling the user to electronically rotate the first virtual graphical wheel to identify a selected action;

enabling the user to electronically rotate the at least one adjoining virtual graphical wheel to identify a selected topic associated with the selected action, wherein the selected topic further defines the selected action, wherein the selected topic enables the user to identify narrowing criteria based on additional filtering criteria pertinent to the user including user selected personalized current or targeted geographical and temporal filters;

identifying, based upon the selected action and the selected topic, a plurality of selected product and service providers from among the plurality of participating product and service providers; and transmitting the plurality of selected product and service providers to the user wherein the plurality of identifiers identifying actions, topics and narrowing criteria are dynamically updated in real-time on said at least three virtual graphical wheels in accordance with current or targeted personalized geographical and/or temporal filters specific to the user; and wherein the selected action, topic and narrowing criteria are linked in an implied hierarchical order in that the selected topic further defines the previously selected action by particularizing the object of the selected activity of interest to the user and the selected narrowing criteria further defines the previously selected topic by particularizing the previously selected topic wherein the plurality of identifiers identifying actions, topics and narrowing criteria are dynamically updated in real-time on said at least three virtual graphical wheels in accordance with current or targeted personalized geographical and/or temporal filters specific to the user.

17. A system for facilitating communications between a user and a sponsor, comprising:
   a) means for receiving product and service information from a plurality of product and service providers;
   b) means for creating a matrix including at least a first, second and third column each column including a plurality of rows containing displayable indicators; the displayable indicators in the first column indicating a plurality of actions identifying activities of interest to a user, the displayable indicators in the second column indicating a plurality of topics associated with the actions identifying activities of interest to the user, the displayable indicators in the third column indicating a plurality of narrowing criteria
   c) means for displaying the displayable indicators in the first column indicating a plurality of actions identifying activities of interest to a user
   d) means for displaying the displayable indicators in the second column indicating a plurality of topics associated with the identifying activities of interest to the user;
   e) means for displaying the displayable indicators in the third column indicating narrowing criteria further defining the displayed actions and topics
   f) means for enabling a user to display the matrix graphically, the first column comprising a first virtual graphical wheel and the at least one additional column comprising at least one adjoining virtual graphical wheel;
   g) means for enabling the user to electronically rotate the first virtual graphical wheel to identify a selected action identifying a particular activity of interest to the user;
   h) means for enabling the user to electronically rotate the at least one adjoining virtual graphical wheel to identify a selected topic associated with the selected action, wherein the selected topic enables the user to identify narrowing criteria based on additional filtering criteria pertinent to the user including user selected personalized current or targeted geographical and temporal filters;
   i) means for identifying, based on the selected activity of interest to the user, selected topic and selected narrowing criteria, at least one product or service provider from among said plurality of participating product and service providers,
   j) means for transmitting the at least one identified product or service provider to the user wherein the selected action, topic and narrowing criteria are linked in an implied hierarchical order in that the selected topic further defines the previously selected action by particularizing the object of the selected activity of interest to the user and the selected narrowing criteria further defines the previously selected topic by particularizing the previously selected topic, and wherein the plurality of identifiers identifying actions, topics and narrowing criteria are dynamically updated in real-time on said at least three virtual graphical wheels in accordance with current or targeted personalized geographical and/or temporal filters specific to the user.

18. A method of operating an electronic display to identify a provider of products and services, comprising:
   a) electronically displaying at least three virtual graphical wheels to a user, the first virtual graphical wheel comprising a plurality of indicators identifying actions identifying activities of interest to a user, the second virtual graphical wheel comprising a plurality of indicators identifying topics associated with the actions and a third virtual graphical wheel comprising a plurality of indicators identifying narrowing criteria associated with the actions and the topics;
   b) electronically rotating the at least three graphical wheels to identify an action identifying an activity of interest to the user, a topic and a narrowing criteria;
   c) identifying by the system, based on the transmitted action identifying an activity of interest to the user, topic and narrowing criteria at least one product or service provider from among a plurality of product and service providers;
   d) receiving information from the system pertaining to the identified at least one product or service provider from the system based on the selected action identifying an activity of interest to the user, topic and narrowing criteria wherein the selected action, topic and narrowing criteria are linked in an implied hierarchical order in that the selected topic further defines the previously selected action by particularizing the object of the selected activity of interest to the user and the selected narrowing criteria further defines the previously selected topic by particularizing the previously selected topic, and wherein the plurality of identifiers identifying actions, topics and narrowing criteria are dynamically updated in real-time on said at least three virtual graphical wheels in accordance with current or targeted personalized geographical and/or temporal filters specific to the user.

19. The method of claim 18 further comprising the steps of:
   electronically displaying a third virtual graphical wheel containing indicators of narrowing criteria for the information;
   electronically rotating the third virtual graphical wheel to select an indicator of narrowing criteria, wherein the narrowing criteria further defines the selected topic;
   transmitting an indication of the selected indicator of narrowing criteria to the system; and
   receiving from the system narrowed information based on the selected indicator of narrowing criteria.

20. The method of claim 19 wherein the steps of displaying the first, second and third virtual graphical wheels include displaying the first, second and third virtual graphical wheels on a mobile communications device.

21. The method of claim 19 wherein the narrowed information relates to products and further including the step transmitting to the system authorization to transmit an identifier of the user to at least one provider of products.

22. The method of claim 21 and further including the steps of: identifying at least one favorite product; and automatically receiving update information relating to the at least one favorite product.

23. The method of claim 18 wherein the step of electronically rotating includes operating a button associated with the display.

24. A system for operating an electronic display to identify a provider of products and services, comprising: a memory storing control instructions; and a processor connected to the memory and operative with the control instructions to perform the steps of:
   a) electronically displaying at least three virtual graphical wheels to a user, the first virtual graphical wheel comprising a plurality of indicators identifying actions identifying activities of interest to a user, the second virtual graphical wheel comprising a plurality of indicators identifying topics associated with the actions and a third virtual graphical wheel comprising a plurality of indicators identifying narrowing criteria associated with the actions and the topics;
b) electronically rotating the at least three graphical wheels to identify an action identifying an activity of interest to the user, a topic and a narrowing criteria;
c) transmitting the selected action identifying an activity of interest to the user, topic and narrowing criteria to a system;
d) identifying by the system, based on the transmitted action identifying an activity of interest to the user, topic and narrowing criteria at least one product or service provider from among a plurality of product and service providers;
e) receiving information from the system pertaining to the identified at least one product or service provider from the system based on the selected action identifying an activity of interest to the user, topic and narrowing criteria wherein the selected action, topic and narrowing criteria are linked in an implied hierarchical order in that the selected topic further defines the previously selected action by particularizing the object of the selected activity of interest to the user and the selected narrowing criteria further defines the previously selected topic by particularizing the previously selected topic, and wherein the plurality of identifiers identifying actions, topics and narrowing criteria are dynamically updated in real-time on said at least three virtual graphical wheels in accordance with current or targeted personalized geographical and/or temporal filters specific to the user.

25. A system for operating an electronic display to identify a provider of products and services, comprising:
a) means for electronically displaying at least three virtual graphical wheels to a user, the first virtual graphical wheel comprising a plurality of indicators identifying actions identifying activities of interest to a user, the second virtual graphical wheel comprising a plurality of indicators identifying topics associated with the actions and a third virtual graphical wheel comprising a plurality of indicators identifying narrowing criteria associated with the actions and the topics;
b) means for electronically rotating the at least three graphical wheels to identify an action identifying an activity of interest to the user, a topic and a narrowing criteria;
c) means for transmitting the selected action identifying an activity of interest to the user, topic and narrowing criteria to a system;
d) means for identifying by the system, based on the transmitted action identifying an activity of interest to the user, topic and narrowing criteria at least one product or service provider from among a plurality of product and service providers;
e) means for receiving information from the system pertaining to the identified at least one product or service provider from the system based on the selected action identifying an activity of interest to the user, topic and narrowing criteria wherein the selected action, topic and narrowing criteria are linked in an implied hierarchical order in that the selected topic further defines the previously selected action by particularizing the object of the selected activity of interest to the user and the selected narrowing criteria further defines the previously selected topic by particularizing the previously selected topic, and wherein the plurality of identifiers identifying actions, topics and narrowing criteria are dynamically updated in real-time on said at least three virtual graphical wheels in accordance with current or targeted personalized geographical and/or temporal filters specific to the user.

* * * * *